Feb. 21, 1933.  A. RICE  1,898,746

DISPLAY DEVICE

Filed Nov. 25, 1932  4 Sheets-Sheet 1

INVENTOR
Alexander Rice
BY
Henry Ruhl
ATTORNEY

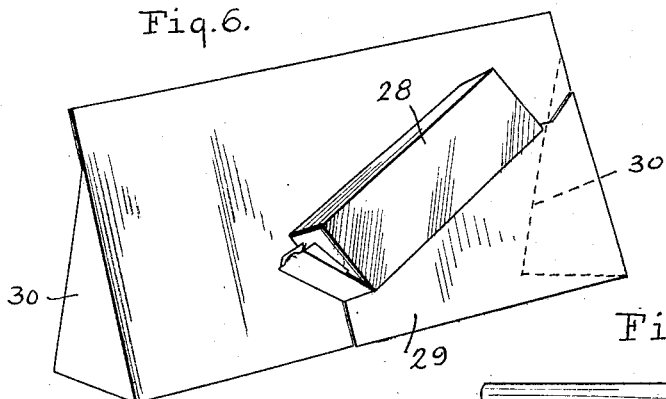
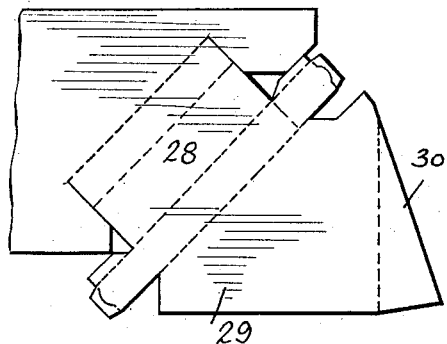
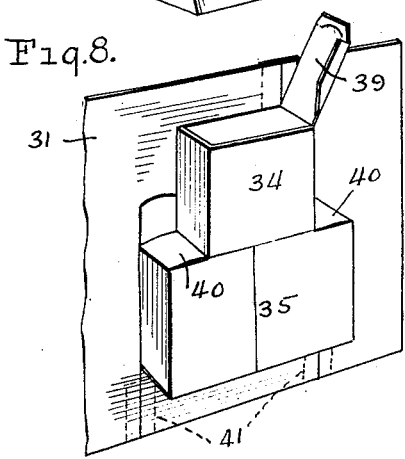
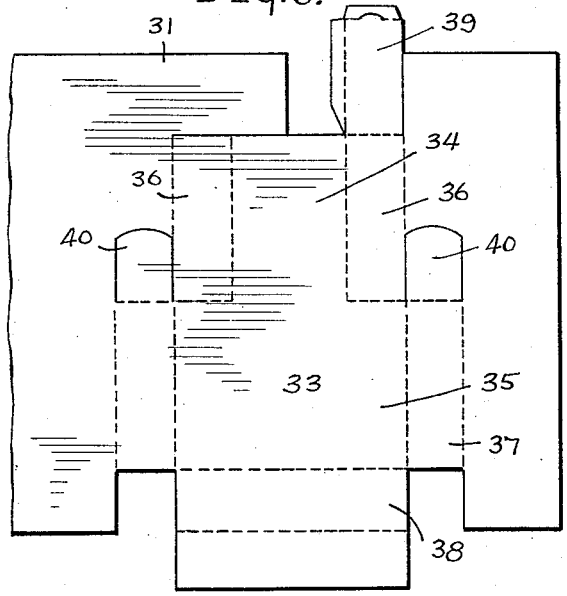
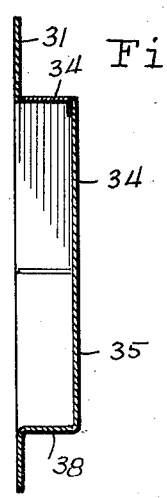

Feb. 21, 1933. A. RICE 1,898,746
DISPLAY DEVICE
Filed Nov. 25, 1932 4 Sheets-Sheet 3
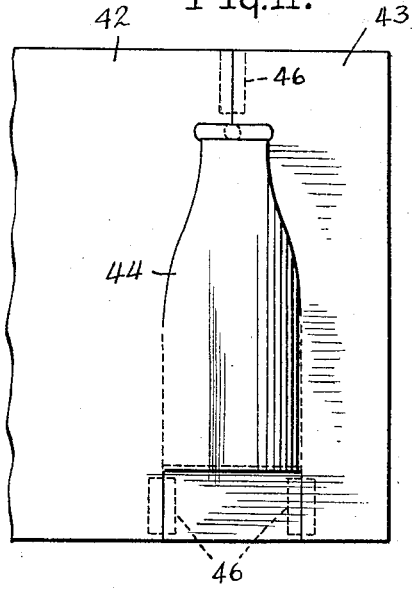
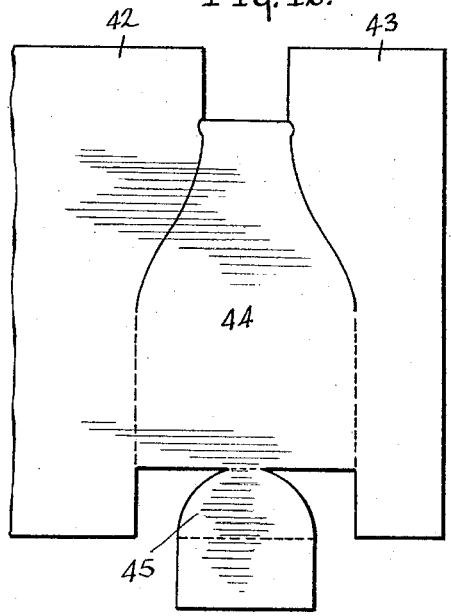
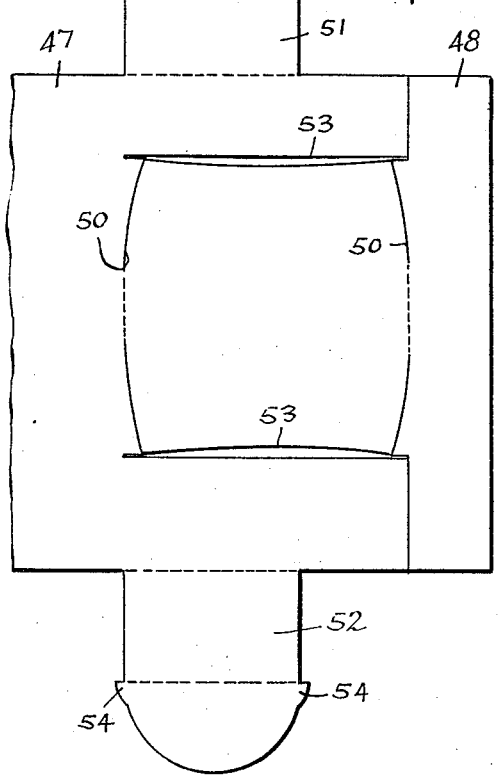
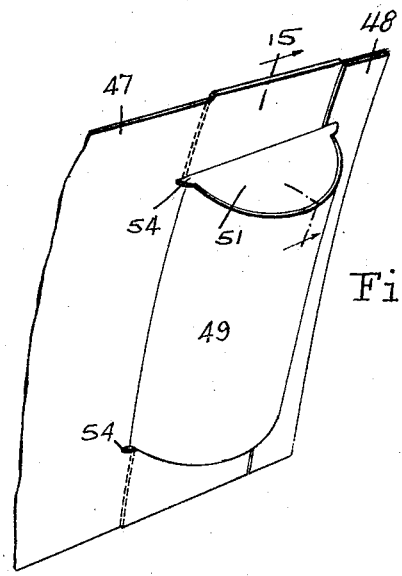
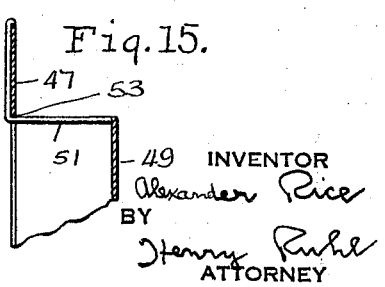

Feb. 21, 1933.  A. RICE  1,898,746
DISPLAY DEVICE
Filed Nov. 25, 1932  4 Sheets-Sheet 4
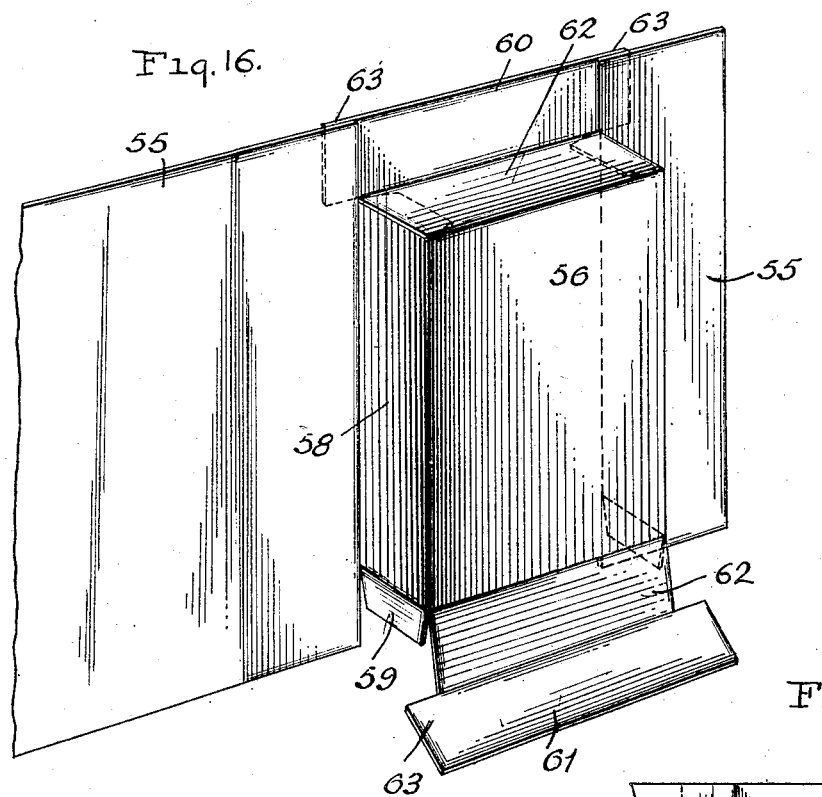
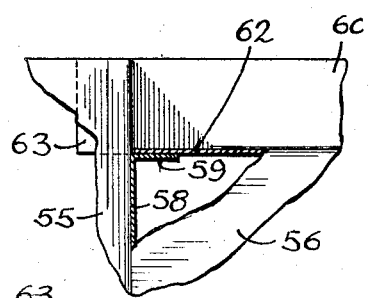
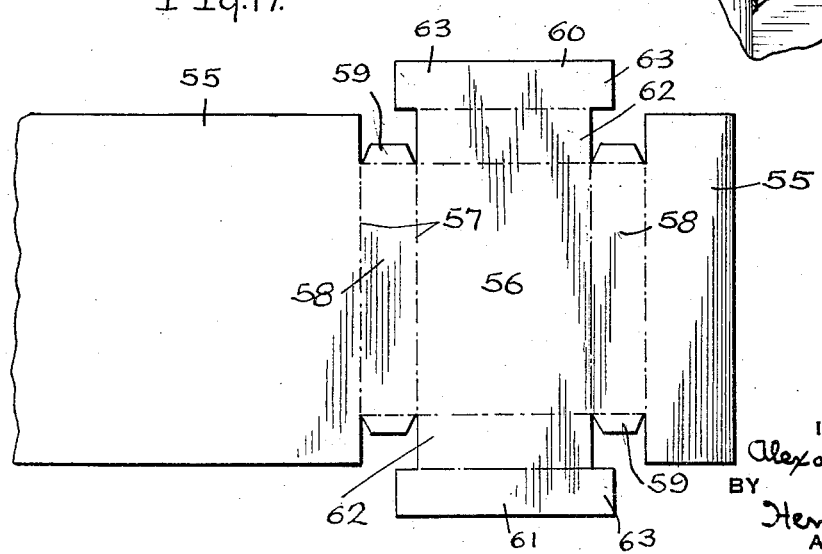

Patented Feb. 21, 1933

1,898,746

UNITED STATES PATENT OFFICE

ALEXANDER RICE, OF BROOKLYN, NEW YORK

DISPLAY DEVICE

Application filed November 25, 1932. Serial No. 644,158.

This invention relates to improvements in display devices and has particular reference to advertising cards on which are displayed, in relief, facsimiles of articles of various types.

An object of the invention is to provide an improved device of simple and practical construction which will form an effective display for advertising in railway cars, show windows, and like places, and which is made from a single blank of flexible material from which is formed a base and a three-dimensional figure simulating an article such as package or the like.
Further and more specific objects will appear more clearly from the following description when taken in connection with the accompanying drawings in which several different forms of the invention are illustrated.
In the drawings:

Figure 6 is a view similar to Fig. 1 showing a slightly different form of the invention.

Figure 7 is a plan view of the blank from which the device of Fig. 6 is formed.

Figure 8 is a perspective view of another form of device.

Figure 9 is a plan view of the blank of the device of Fig. 8.
Figure 10 is a vertical section through said device.

Figure 11 is a front elevation of another form of device.

Figure 12 is a plan view of the blank thereof.

Figure 13 is a similar view of another form of device.

Figure 14 is a perspective view of the device formed from the blank of Fig. 13.

Figure 15 is a section of the line 15—15 of Fig. 14.

Figure 16 is a perspective view of still another form of device, showing the same in a partially unfolded position.

Figure 17 is a plan view of the blank from which the device of Figure 16 is formed, and Figure 18 is a fragmentary sectional view through the device in folded position.

Figure 1:
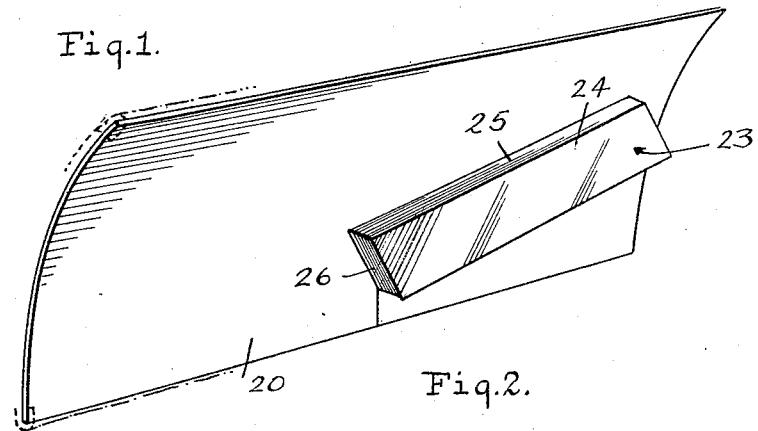
Figure 1 is a perspective view of one form of display device showing a carton as the article to be displayed.
Figure 2:
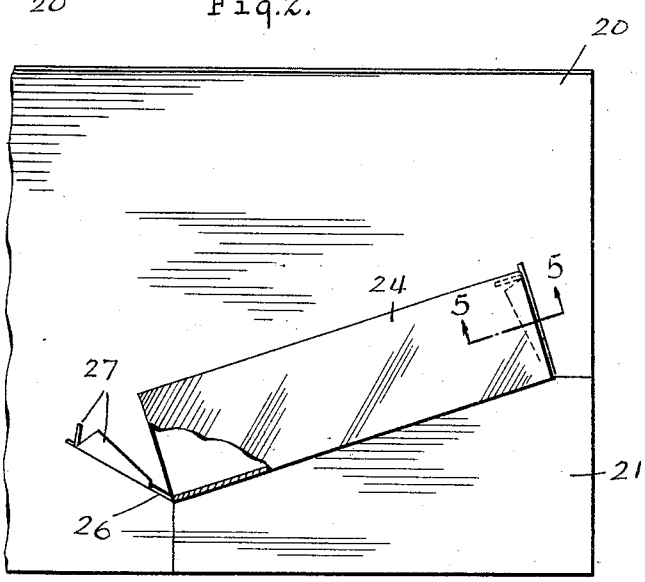
Figure 2 is a front elevation thereof, partly broken away and shown in section.
Figure 4:
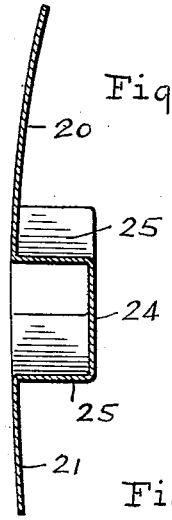
Figure 4 is a vertical transverse section.
Figure 3:
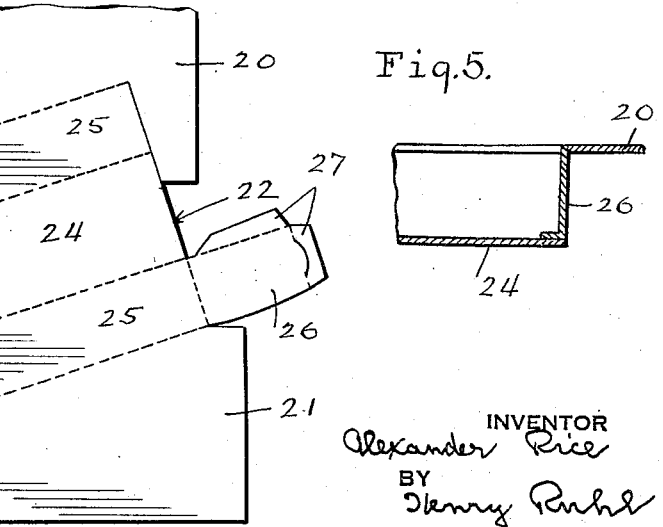
Figure 3 is a plan view of the blank from which the device of Fig. 1 is formed.
Figure 5:
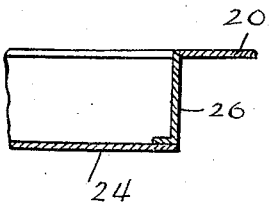
Figure 5 is a fragmentary longitudinal section substantially on the line 5—5 of Fig. 2.

Referring more particularly to Figs. 1 to 5, wherein there is illustrated a device adapted for use as a display for cars in which frames are provided for receiving the device, the latter, as in all other forms of the invention, is made of a suitable flexible material such as cardboard or the like, and is formed from a single blank as shown in Fig. 3. Essentially, the device, when in its set-up condition, comprises a base from which projects in offset relation, the facsimile of an article such as a carton. To form said elements, the blank consists of two end sections 20 and 21, which are spaced from each other in the blank and, in the present instance, are staggered relative to each other owing to the fact that the intermediate portion 22 from which the article is formed is disposed diagonally across the base when the device is completed. The article being simulated is a carton 23 such as used to contain cigarettes and, in order to provide a three-dimensional figure, the intermediate portion 22 is cut and scored so as to form the longitudinal front 24 and sides 25, and the end members 26 having flaps 27. Portions of the front 24 and one of the sides 25 are outlined or bordered by the end section 20 while a part of the other side is outlined by the end section 21. When the blank is folded on the score lines defining the several parts 24 to 27 of the article, the inner or adjacent edges of the sections 20 and 21 are brought together in juxtaposition so that said edges meet or overlap as best shown in Fig. 1 and 2. Then after the end members 26 are folded inward and the flaps 27 inserted into the ends of the body of the carton to frictionally hold said members in position, a three-dimensional representation of the article to be displayed is completed. The folded blank may now be inserted into the holding frame in a railway car and its engagement therein will cause the device to be bowed and thus be frictionally retained in its set-up condition in said frame. If desired, the meeting edges of the sections 20 and 21 which constitute the base of the device may be secured together by an adhesive strip (not shown) attached to the back of said section. Also, in order to make the representation appear more realistic, the article 23 may be covered with cellophane paper.

The device of Figs. 6 and 7 again contains the representation of a carton 28 similar to the carton 23, mounted upon the sectional base 29. The blank from which the present device is formed is substantially the same as that of Fig. 3 and therefore a detailed description thereof is deemed unnecessary. However, it is to be noted that in this form, which is especially adapted for window displays and the like, the base is flat and is in the form of an easel. For this purpose, each end section constituting a part of the base 29 is provided with an end of flap 30 foldable back to provide a support for maintaining the device in a substantially upright position.

In Figs. 8 to 10, there is again shown a device having a three-dimensional representation of an article projecting from a base. The blank from which this device is made comprises the end sections 31 and 32 portions of which outline the intermediate section 33. This latter section is scored to provide the upper and lower portions 34 and 35 of different dimensions and simulating the front of a carton. Sides 36 and 37 are provided for said portions and the bottom and top closure flaps 38 and 39, respectively, constitute further elements for completing the representation. Also, closure flaps 40 are cut from the sections 31 and 32 for closing the openings at either side of the lower portion 35 of the carton and the openings formed by cutting out said flaps 40 may be covered by a background of paper or the like. When the blank is folded on the score lines, the end sections are moved toward each other until their inner edges meet whereupon, if desired, said section may be secured together by adhesive strips 41 attached to said meeting edges.

Figs. 11 and 12 disclose the representation of a bottle and again, in this instance, spaced end sections 42 and 43 of the blank are connected by and partially border the intermediate section 44, the blank being partly scored and partly cut to form the outline of the latter section. In this case, the section 44 is bowed outwardly as the device is formed so that the inner edges of the sections 42 and 43 are caused to meet and said section 44 is provided at its lower end with a flap 45 constituting a bottom closure for the bottle, which flap is turned in with the free end thereof extending in back of the base of the device. Adhesive strips 46 may be applied to the meeting edges of the sections 42, 43 to secure them in position.

In Figs. 13 to 15 the device is again of a type which may be used as a car sign adapted to be bowed and held in place within a frame. The blank comprises the end sections 47 and 48 joined by the intermediate section 49 which simulates the body of a can or the like. The scored and cut side edges 50, which are outlined by the end sections, are curved so that when the device is set up and bowed to fit in the supporting frame, said edges will conform to the contour of the base formed by said sections 47, 48 and thereby prevent buckling of the section 49. As the end sections are brought together, the section 49 is bent outwardly so that the third dimension of the article will be formed. Top and bottom closures for said article are provided in the form of flaps 51 and 52 extending from the upper and lower edges of the section 47. Each of these flaps is folded backwardly against the base and then extended laterally through a slit 53 to form said closures and after the end sections have been brought together, small extensions 54 on said flaps engage the front faces of said section at the ends of said slits and thereby retain the flaps in position to represent closures.

Again in Figs. 16 to 18, the device is designed to simulate a carton of rectangular construction and, in this instance, the device comprises a base including the end sections 55 between which is located the intermediate section 56, from which the article representing a carton is formed. This latter section is scored as indicated at 57, to define the sides 58 of the carton, and these sides are provided with end flaps 59 which are bent inwardly as shown in Fig. 18 to add rigidity to the structure when folded and placed in a supporting frame. Top and bottom sections 60 and 61 are formed along the upper and lower edges of the intermediate section 56 and are scored to provide the remaining sides 62 of the carton when the device is folded. The outer ends of said sections 60, 61 are longer than the sides 62 to form extensions 63 at each end which, when the device is folded, engage beneath the adjacent ends of the sections 55 and may be secured thereto by an adhesive, if desired. Thus, said sections 60, 61 constitute, in combination with the sections 55, the entire base of the device and, when the latter is folded, the inner edges of the sections 55 at the ends of the sides 58 abut against the ends of the sides 62, thereby limiting the inward movement of said end sections 55 as the device is being set up and further adding to the rigidity of the device at the various points of contact of said sections with said sides. With such a construction, it is possible to employ comparatively light material in the making of the device and still maintain the representation of the carton in true rectangular form.

What is claimed is:

1. A display device formed from a single blank of material cut and scored to define normally spaced end sections which are movable to positions adjacent to each other to provide a base for the device, and an intermediate section located between said end sections and bendable, when said end sections are moved toward each other, to form a three-dimensional figure extending laterally from said base and simulating an article of merchandise or the like.

2. A display device formed from a single blank of material cut and scored to define normally spaced end sections movable to juxtaposed positions relative to each other to form a continuous base for the device, and an intermediate section between said end sections movable to a laterally offset position relative to said base and having portions connected to said end sections, which constitute the third dimension of an article formed from and simulated by said intermediate section when the same is offset.

3. A display device formed from a single blank of material cut and scored to define a pair of spaced end sections portions of the inner adjacent edges of which outline parts of the blank of an article, and an intermediate section between said end sections and bendable to form a three-dimensional figure simulating an article, said inner adjacent edges being brought into juxtaposition with each other, when said intermediate section is bent, so as to provide a continuous base for the device.

4. A display device formed from a single blank of material cut and scored to define a pair of end sections, portions of the edges of which outline parts of the blank of an article and other spaced portions of said edges being brought together to connect said end sections to form a base for the device, and another section between said end sections and including said article blank, said other section being bendable when said edges are brought together to form a three-dimensional figure projecting from said base.

5. A display device formed from a single blank of material, cut and scored to define end sections and an intermediate section, the latter section being bendable to an offset position projecting from said end sections to simulate the body of an article, and flaps on one of said end sections foldable against the back thereof and projecting from between the same and said intermediate section to form the end members of said article.

6. A display device comprising a section which is bendable to form a figure simulating an article of merchandise or the like, and other sections extending from edges of the first named section and movable to positions contiguous to each other, when said intermediate section is bent, to form a continuous base from which the latter section projects.

ALEXANDER RICE.